(12) United States Patent
Kikuchi et al.

(10) Patent No.: US 8,932,748 B2
(45) Date of Patent: Jan. 13, 2015

(54) MULTI-LAYER, MICROPOROUS POLYOLEFIN MEMBRANE, ITS PRODUCTION METHOD, AND BATTERY SEPARATOR

(75) Inventors: Shintaro Kikuchi, Saitama (JP); Kotaro Takita, Nasushiobara (JP)

(73) Assignee: Toray Battery Separator Film Co., Ltd, Tochigi (JP)

( * ) Notice: Subject to any disclaimer, the term of this patent is extended or adjusted under 35 U.S.C. 154(b) by 1360 days.

(21) Appl. No.: 12/091,351

(22) PCT Filed: Oct. 23, 2006

(86) PCT No.: PCT/JP2006/321084
§ 371 (c)(1),
(2), (4) Date: Apr. 24, 2008

(87) PCT Pub. No.: WO2007/049568
PCT Pub. Date: May 3, 2007

(65) Prior Publication Data
US 2009/0098450 A1    Apr. 16, 2009

(30) Foreign Application Priority Data

Oct. 24, 2005 (JP) ................................. 2005-308743
Oct. 24, 2005 (JP) ................................. 2005-308744

(51) Int. Cl.
*H01M 2/16* (2006.01)
*B32B 27/32* (2006.01)
*H01M 10/052* (2010.01)

(52) U.S. Cl.
CPC ............ *H01M 2/1653* (2013.01); *B32B 27/32* (2013.01); *H01M 2/166* (2013.01); *H01M 2/1686* (2013.01); *H01M 10/052* (2013.01)
USPC ........................................................ 429/145

(58) Field of Classification Search
USPC .................... 429/145; 428/315.5; 156/244.23
See application file for complete search history.

(56) References Cited

U.S. PATENT DOCUMENTS

| | | | |
|---|---|---|---|
| 4,650,730 A * | 3/1987 | Lundquist et al. ............... 429/62 |
| 5,691,047 A * | 11/1997 | Kurauchi et al. .......... 428/315.7 |
| 6,180,280 B1 | 1/2001 | Spotnitz |
| 6,245,272 B1 | 6/2001 | Takita et al. |
| 6,566,012 B1 | 5/2003 | Takita et al. |
| 2003/0168764 A1 | 9/2003 | Nishida et al. |
| 2005/0058823 A1* | 3/2005 | Funaoka et al. ........... 428/315.5 |
| 2006/0103055 A1 | 5/2006 | Hoshuyama et al. |
| 2007/0012617 A1 | 1/2007 | Suzuki et al. |
| 2009/0098341 A1* | 4/2009 | Takita et al. ................. 428/159 |

FOREIGN PATENT DOCUMENTS

| | | |
|---|---|---|
| CN | 1294607 A | 5/2001 |
| CN | 1294608 A | 5/2001 |
| CN | 1437629 A | 8/2003 |
| JP | 6-182918 A | 7/1994 |
| JP | 6-240036 A | 8/1994 |
| JP | 11115084 A | 4/1999 |
| JP | 11-317212 A | 11/1999 |
| JP | 2001-162741 A | 6/2001 |
| JP | 2003-105123 A | 4/2003 |
| JP | 2004-149637 * | 5/2004 |
| JP | 2004-149637 A | 5/2004 |
| JP | 2004-161899 A | 6/2004 |
| WO | 99/48959 A1 | 9/1999 |
| WO | 00/20492 A1 | 4/2000 |
| WO | 2005/023919 A1 | 3/2005 |
| WO | WO 2006/106783 * | 10/2006 |

OTHER PUBLICATIONS

Chinese Office Action dated Nov. 30, 2010.
Japanese Patent Office, "Notice of Reason for Rejection," issued in connection with Japanese Patent Application No. 2012-094260, dated Jan. 15, 2013.
Indian Office Action dated Mar. 28, 2014 from the Government of India Patent Office Intellectual Property Building, in counterpart Indian Application No. 4109/DELNP/2008.

* cited by examiner

*Primary Examiner* — Larry Thrower
(74) *Attorney, Agent, or Firm* — Sughrue Mion, PLLC

(57) ABSTRACT

(1) a combination of a microporous layer made of a polyethylene resin and a microporous layer made of polypropylene and a heat-resistant resin having a melting point or a glass transition temperature of 170° C. or higher, or (2) a combination of a microporous layer made of a polyethylene resin and a microporous layer made of polypropylene and inorganic filler having an aspect ratio of 2 or more provides a multi-layer, microporous polyolefin membrane with well-balanced permeability, mechanical strength, heat shrinkage resistance, shutdown properties and meltdown properties.

2 Claims, No Drawings

MULTI-LAYER, MICROPOROUS POLYOLEFIN MEMBRANE, ITS PRODUCTION METHOD, AND BATTERY SEPARATOR

CROSS REFERENCE TO RELATED APPLICATIONS

This application is a National Stage of International Application No. PCT/JP2006/321084 filed on Oct. 23, 2006, claiming priority based on Japanese Patent Application Nos. 2005-308743 and 2005-308744, filed Oct. 24, 2005, the contents of all of which are incorporated herein by reference in their entirety.

FIELD OF THE INVENTION

The present invention relates to a multi-layer, microporous polyolefin membrane comprising a polyethylene resin layer and a polypropylene-containing layer, thereby having well-balanced permeability, mechanical strength, heat shrinkage resistance, shutdown properties and meltdown properties, its production method, and a battery separator.

BACKGROUND OF THE INVENTION

Microporous polyolefin membranes are widely used in separators for lithium batteries, etc., electrolytic capacitor separators, various filters, steam-permeable, waterproof clothing, etc. When the microporous polyolefin membranes are used as battery separators, their performance largely affects the performance, productivity and safety of batteries. Accordingly, microporous polyolefin membranes are required to have excellent permeability, mechanical properties, heat shrinkage resistance, shutdown properties, meltdown properties, etc.

In general, microporous membranes made only of polyethylene have low meltdown temperatures, while microporous membranes made only of polypropylene have high shutdown temperatures. Accordingly, microporous membranes based on polyethylene and polypropylene are suitable for battery separators. Thus proposed are microporous membranes made of a mixture of polyethylene and polypropylene, and multi-layer, microporous membranes comprising a polyethylene layer and a polypropylene layer.

For instance, JP 05-251069 A and JP 05-251070 A disclose separators free from thermal runaway, which are formed by a multi-layer, microporous sheet comprising a first layer made of an ethylene-butene copolymer or an ethylene-hexene copolymer, which undergoes shutdown at 80 to 150° C., and a second layer made of polypropylene, which undergoes shutdown at a higher temperature than in the first layer by 10° C. or more.

JP 05-251069 A discloses a method for producing a multi-layer, microporous sheet comprising the steps of producing a laminate sheet comprising a layer made of the above copolymer and an extractable solvent and a layer made of polypropylene and an extractable solvent, removing the extractable solvent from the sheet to obtain a microporous sheet, and stretching the microporous sheet at a temperature of 25 to 110° C. JP 05-251070 A discloses a method for producing a multi-layer, microporous sheet comprising the steps of simultaneously extruding a melt of the above copolymer and a polypropylene melt, cooling the melts to obtain a laminate sheet, stretching the laminate sheet at a temperature from −198° C. to −70° C., and heat-treating the laminate sheet.

However, investigation by the inventors have revealed that the methods described in the above references produce multi-layer, microporous membranes comprising a polypropylene layer and a polyethylene layer, which have small pore diameters in the polypropylene layer, thereby having insufficient permeability.

JP 62-10857 A proposes a battery separator having excellent dimensional stability and shutdown properties, which comprises (a) a first layer formed by a microporous sheet of polyethylene or polypropylene, which loses pores with its size substantially unchanged at a temperature of about 80° C. to 150° C., and (b) a second layer formed by a microporous sheet made of polyethylene or polypropylene and filler particles, which keeps its microporous structure and size in a range from room temperature to a temperature higher than the pore-losing temperature of the first layer by at least about 10° C. However, the battery separator of JP 62-10857 A does not have sufficient mechanical strength, because the filler particles do not have optimized aspect ratios.

Thus desired is a multi-layer, microporous polyolefin membrane comprising a polyethylene-containing layer and a polypropylene-containing layer, thereby having well-balanced permeability, mechanical strength, heat shrinkage resistance, shutdown properties and meltdown properties.

Object of The Invention

Accordingly, an object of the present invention is to provide a multi-layer, microporous polyolefin membrane comprising a polyethylene resin layer and a polypropylene-containing layer, thereby having well-balanced permeability, mechanical strength, heat shrinkage resistance, shutdown properties and meltdown properties, its production method, and a battery separator.

DISCLOSURE OF THE INVENTION

As a result of intense research in view of the above object, the inventors have found that (1) a combination of a microporous layer made of a polyethylene resin with a microporous layer made of polypropylene and a heat-resistant resin having a melting point or a glass transition temperature of 170° C. or higher, or (2) a combination of a microporous layer made of a polyethylene resin with a microporous layer made of polypropylene and inorganic filler having an aspect ratio of 2 or more provides a multi-layer, microporous polyolefin membrane with well-balanced permeability, mechanical strength, heat shrinkage resistance, shutdown properties and meltdown properties. This invention has been completed based on such finding.

Thus, the first multi-layer, microporous polyolefin membrane of the present invention comprises a microporous layer made of a polyethylene resin, and a microporous layer made of polypropylene and a heat-resistant resin having a melting point or a glass transition temperature of 170° C. or higher.

The second multi-layer, microporous polyolefin membrane of the present invention comprises a microporous layer made of a polyethylene resin, and a microporous layer made of polypropylene and inorganic filler having an aspect ratio of 2 or more.

The first method of the present invention for producing a multi-layer, microporous polyolefin membrane comprises the steps of melt-blending a polyethylene resin and a membrane-forming solvent to prepare a polyethylene solution, and melt-blending polypropylene, a heat-resistant resin having a melting point or a glass transition temperature of 170° C. or higher and a membrane-forming solvent to prepare a polypropylene/heat-resistant resin mixture solution; (1) simultaneously extruding the polyethylene solution and the polypropylene/heat-resistant resin mixture solution through a die, cooling the resultant extrudate to provide a gel-like laminate sheet, and removing the membrane-forming solvent from the gel-like laminate sheet; (2) extruding the polyethylene solution and the polypropylene/heat-resistant resin mixture solution through separate dies, cooling the resultant extrudates to provide gel-like sheets, laminating the gel-like sheets, and removing the membrane-forming solvent from the resultant gel-like laminate sheet; or (3) extruding the polyethylene solution and the polypropylene/heat-resistant resin mixture solution through separate dies, cooling the resultant extrudates to provide gel-like sheets, removing the membrane-forming solvent from the gel-like sheets, and laminating the resultant microporous polyethylene membrane and the resultant microporous polypropylene membrane.

In the above first method, the step (1) preferably comprises (i) stretching the gel-like laminate sheet, and then removing the membrane-forming solvent, (ii) removing the membrane-forming solvent, and then stretching the resultant multi-layer, microporous membrane, or (iii) stretching the gel-like laminate sheet, removing the membrane-forming solvent, and then stretching the resultant multi-layer, microporous membrane The step (2) preferably comprises (i) stretching the gel-like sheets, and then laminating them, (ii) stretching the gel-like laminate sheet, and then removing the membrane-forming solvent, (iii) removing the membrane-forming solvent, and then stretching the resultant multi-layer, microporous membrane, or (iv) conducting at least two of the steps (i) to (iii). The step (3) preferably comprises (i) stretching the gel-like sheets, and then removing the membrane-forming solvent, (ii) stretching the microporous polyethylene membrane and the microporous polypropylene membrane, and then laminating them, (iii) laminating the microporous polyethylene membrane and the microporous polypropylene membrane, and then stretching the resultant laminate, or (iv) conducting at least two of the steps (i) to (iii)

The second method of the present invention for producing a multi-layer, microporous polyolefin membrane comprises the steps of melt-blending a polyethylene resin and a membrane-forming solvent to prepare a polyethylene solution, and dispersing inorganic filler having an aspect ratio of 2 or more in a melt blend of polypropylene and a membrane-forming solvent to prepare an inorganic-filler-containing polypropylene solution; (1) simultaneously extruding the resultant polyethylene solution and the inorganic-filler-containing polypropylene solution through a die, cooling the resultant extrudate to provide a gel-like laminate sheet, and removing the membrane-forming solvent from the gel-like laminate sheet; (2) extruding the polyethylene solution and the inorganic-filler-containing polypropylene solution through separate dies, cooling the resultant extrudates to provide gel-like sheets, laminating the gel-like sheets, and removing the membrane-forming solvent from the resultant gel-like laminate sheet; or (3) extruding the polyethylene solution and the inorganic-filler-containing polypropylene solution through separate dies, cooling the resultant extrudates to provide gel-like sheets, removing the membrane-forming solvent from the gel-like sheets, and laminating the resultant microporous polyethylene membrane and the resultant microporous polypropylene membrane.

In the above second method, the step (1) preferably comprises (i) stretching the gel-like laminate sheet, and then removing the membrane-forming solvent, (ii) removing the membrane-forming solvent, and then stretching the resultant multi-layer, microporous membrane, or (iii) stretching the gel-like laminate sheet, removing the membrane-forming solvent, and then stretching the resultant multi-layer, microporous membrane. The step (2) preferably comprises (i) stretching the gel-like sheets, and then laminating them, (ii) stretching the gel-like laminate sheet, and then removing the membrane-forming solvent, (iii) removing the membrane-forming solvent, and then stretching the resultant multi-layer, microporous membrane, or (iv) conducting at least two of the steps (i) to (iii). The step (3) preferably comprises (i) stretching the gel-like sheets, and then removing the membrane-forming solvent, (ii) stretching the microporous polyethylene membrane and the microporous polypropylene membrane, and then laminating them, (iii) laminating the microporous polyethylene membrane and the microporous polypropylene membrane, and then stretching the resultant laminate, or (iv) conducting at least two of the steps (i) to (iii)

The battery separator of the present invention is formed by the above first or second multi-layer, microporous polyolefin membrane.

DESCRIPTION OF THE PREFERRED EMBODIMENTS

[1] First Multi-Layer, Microporous Polyolefin Membrane

The first multi-layer, microporous polyolefin membrane comprises a microporous layer made of a polyethylene resin (hereinafter referred to as "polyethylene resin layer" unless otherwise mentioned), and a microporous layer made of polypropylene and a heat-resistant resin having a melting point or a glass transition temperature of 170° C. or higher (hereinafter referred to as "polypropylene/heat-resistant resin mixed layer" unless otherwise mentioned).

(A) Polyethylene Resin Layer (1) Polyethylene Resin

The polyethylene resin is (a) ultra-high-molecular-weight polyethylene, (b) other polyethylene than the ultra-high-molecular-weight polyethylene, (c) a mixture of ultra-high-molecular-weight polyethylene with the other polyethylene (polyethylene composition), or (d) a mixture of any one of (a) to (c) with a polyolefin other than polyethylene (polyolefin composition). In any case, though not particularly critical, the mass-average molecular weight (Mw) of the polyethylene resin is preferably $1\times10^4$ to $1\times10^7$, more preferably $1\times10^4$ to $5\times10^6$, particularly $1\times10^4$ to $4\times10^6$.

(a) Ultra-High-Molecular-Weight Polyethylene

The ultra-high-molecular-weight polyethylene has Mw of $5\times10^5$ or more. The ultra-high-molecular-weight polyethylene can be not only an ethylene homopolymer, but also an ethylene-α-olefin copolymer containing a small amount of other α-olefin(s). The other α-olefins than ethylene are preferably propylene, butene-1, pentene-1, hexene-1,4-methylpentene-1, octene-1, vinyl acetate, methyl methacrylate, and styrene. The Mw of the ultra-high-molecular-weight polyethylene is preferably $1\times10^6$ to $15\times10^6$, more preferably $1\times10^6$ to $5\times10^6$. Not only one type of the ultra-high-molecular-weight polyethylene, but also a mixture of two or more types of the ultra-high-molecular-weight polyethylene can be used. The mixture can be, for instance, a mixture of two or more types of the ultra-high-molecular-weight polyethylene having different Mws.

(b) Other Polyethylene than Ultra-High-Molecular-Weight Polyethylene

The other polyethylene than the ultra-high-molecular-weight polyethylene has Mw of $1\times10^4$ or more and less than $5\times10^5$, preferably being high-density polyethylene, medium-density polyethylene, branched low-density polyethylene or linear low-density polyethylene, more preferably high-density polyethylene. The polyethylene having Mw of $1 \times 10^4$ or more and less than $5 \times 10^5$ can be not only an ethylene homopolymer, but also a copolymer containing a small amount of other α-olefin(s) such as propylene, butene-1, hexene-1, etc. Such copolymers are preferably produced using single-site catalysts. Not only one type of polyethylene other than the ultra-high-molecular-weight polyethylene, but also a mixture of two or more types of the other polyethylene than the ultra-high-molecular-weight polyethylene can be used. The mixture can be for instance, a mixture of two or more types of the high-density polyethylene having different Mws, a mixture of similar medium-density polyethylenes, a mixture of similar low-density polyethylenes, etc.

(c) Polyethylene Composition

The polyethylene composition is a mixture of ultra-high-molecular-weight polyethylene having Mw of $5 \times 10^5$ or more, and the other polyethylene having Mw of $1 \times 10^4$ or more and less than $5 \times 10^5$, which is at least one selected from the group consisting of high-density polyethylene, medium-density polyethylene, branched low-density polyethylene, and linear low-density polyethylene. The ultra-high-molecular-weight polyethylene and the other polyethylene can be the same as described above. The molecular weight distribution [mass-average molecular weight/number-average molecular weight (Mw/Mn)] of this polyethylene composition can be easily controlled depending on applications. The polyethylene composition is preferably a composition of the above ultra-high-molecular-weight polyethylene and high-density polyethylene. The content of the ultra-high-molecular-weight polyethylene in the polyethylene composition is preferably 1% or more by mass, more preferably 10 to 80% by mass, based on 100% by mass of the entire polyethylene composition.

(d) Polyolefin Composition

The polyolefin composition is a mixture of the ultra-high-molecular-weight polyethylene, the other polyethylene or the polyethylene composition, and a polyolefin other than polyethylene.

The ultra-high-molecular-weight polyethylene, the other polyethylene, and the polyethylene composition can be the same as described above.

The polyolefin other than polyethylene can be at least one selected from the group consisting of polypropylene, polybutene-1, polypentene-1, polymethylpentene, polyhexene-1, polyoctene-1, polyvinyl acetate, polymethyl methacrylate, polystyrene and ethylene-α-olefin copolymers each having Mw of $1 \times 10^4$ to $4 \times 10^6$, and a polyethylene wax having Mw of $1 \times 10^3$ to $1 \times 10^4$. Polypropylene, polybutene-1, polypentene-1, polymethylpentene, polyhexene-1, polyoctene-1, polyvinyl acetate, polymethyl methacrylate and polystyrene can not only be homopolymers, but also copolymers containing other α-olefin(s). The percentage of the polyolefin other than polyethylene is preferably 20% or less by mass, more preferably 10% or less by mass, based on 100% by mass of the entire polyolefin composition.

(e) Molecular Weight Distribution Mw/Mn

Mw/Mn is a measure of a molecular weight distribution, the larger this value, the wider the molecular weight distribution. Though not critical, the Mw/Mn of the polyethylene resin is preferably 5 to 300, more preferably 10 to 100, when the polyethylene resin is the ultra-high-molecular-weight polyethylene, the other polyethylene or the polyethylene composition. When the Mw/Mn is less than 5, there are excessive high-molecular weight components, resulting in difficulty in melt extrusion. When the Mw/Mn is more than 300, there are excessive low-molecular weight components, resulting in a microporous membrane with decreased strength. The Mw/Mn of the polyethylene (homopolymer or ethylene-α-olefin copolymer) can be properly controlled by multi-stage polymerization. The multi-stage polymerization method is preferably a two-stage polymerization method comprising forming a high-molecular-weight polymer component in the first stage and forming a low-molecular-weight polymer component in the second stage. In the case of the polyethylene composition, the larger the Mw/Mn is, the larger difference in Mw there is between the ultra-high-molecular-weight polyethylene and the other polyethylene, and vice versa. The Mw/Mn of the polyethylene composition can be properly controlled by the molecular weight and percentage of each component.

(2) Function of Polyethylene Resin Layer

The polyethylene resin layer imparts excellent shutdown properties (low shutdown temperature and high shutdown speed) and excellent mechanical strength to the multi-layer, microporous polyolefin membrane.

(B) Polypropylene/Heat-Resistant Resin Mixed Layer (1) Polypropylene

The types of polypropylene are not particularly critical, but the polypropylene can be a homopolymer of propylene, a copolymer of propylene with other olefin and/or diolefin or a mixture thereof, and is preferably a homopolymer. The copolymer can be a random or block copolymer. The other olefins than propylene are preferably ethylene, butene-1, pentene-1, hexene-1,4-methylpentene-1, octene-1, vinyl acetate, methyl methacrylate, and styrene. The diolefins preferably have 4 to 14 carbon atoms. The diolefins having 4 to 14 carbon atoms include, for instance, butadiene, 1,5-hexadiene, 1,7-octadiene, 1,9-decadiene, etc.

The content of the other olefin or diolefin than propylene in the copolymer is preferably within a range not deteriorating the properties such as heat resistance, compression resistance, heat shrinkage resistance, etc. of polypropylene. Specifically, the content of the other olefin or diolefin is preferably less than 10% by mole, based on 100% by mole of the entire copolymer.

The mass-average molecular weight (Mw) of polypropylene is preferably $1 \times 10^4$ to $4 \times 10^6$, more preferably $1 \times 10^5$ to $8 \times 10^5$. The molecular weight distribution (Mw/Mn) of polypropylene is preferably 1.01 to 100, more preferably 1.1 to 50.

(2) Heat-Resistant Resin

The heat-resistant resin has a melting point or a glass transition temperature Tg in a range of 170° C. or higher. The heat-resistant resin is preferably a crystalline resin (including partially crystalline resin) having a melting point of 170° C. or higher, or an amorphous resin having Tg of 170° C. or higher. Tg can be measured according to JIS K7121.

When the heat-resistant resin is added to polypropylene, a battery separator formed by the multi-layer, microporous membrane has improved meltdown properties, thereby providing a battery with improved high-temperature storability. The heat-resistant resin is dispersed as spherical or ellipsoidal fine particles in polypropylene by melt blending. When stretched, polypropylene fibrils are cleft with fine particles of the heat-resistant resin as nuclei, thereby forming creased pores holding fine particles in the center. Accordingly, a battery separator formed by the multi-layer, microporous membrane has improved permeability and compression resistance. Fine particles of the heat-resistant resin have particle sizes (diameters for spherical particles and longer axes for ellipsoidal particles) of preferably 0.1 to 15 μm, more preferably 0.5 to 10 μm, particularly 1 to 10 μm.

When the crystalline resin having a melting point of lower than 170° C. or the amorphous resin having Tg of lower than 170° C. is used, the resin is excessively dispersed in polypropylene by melt blending, so that polypropylene and the heat-resistant resin have close solidification speeds during cooling, failing to form fine particles having proper diameters. As a result, small voids are formed by cleavage with fine resin particles as nuclei, failing to obtain high permeability and compression resistance. Though not critical, the upper limit of the melting point or Tg of the heat-resistant resin is preferably 350° C. from the aspect of blendability with polypropylene. The melting point or Tg of the heat-resistant resin is more preferably 180 to 260° C.

The preferred Mw of the heat-resistant resin is generally $1×10^3$ to $1×10^6$, more preferably $1×10^4$ to $7×10^5$, though variable depending on the type of the resin. The heat-resistant resin having Mw of less than $1×10^3$ is highly dispersed in polypropylene, failing to form fine particles. The heat-resistant resin having Mw of more than $1×10^6$ cannot easily be blended with polypropylene.

Specific examples of the heat-resistant resin include polyesters, polyamides (melting points: 215 to 265° C.), fluororesins, polycarbonates (melting points: 220 to 240° C.), polyarylene sulfides, polymethylpentene, polystyrene (melting point: 230° C.), polyvinyl alcohol (melting point: 220 to 240° C.), polyimides (Tg: 280° C. or higher), polyamideimides (Tg: 280° C.), polyether sulfone (Tg: 223° C.), polyetheretherketone (melting point: 334° C.), cellulose acetate (melting point: 220° C.), cellulose triacetate (melting point: 300° C.), polysulfone (Tg: 190° C.), polyetherimides (melting point: 216° C.), etc. Among them, polyesters, polyamides, polymethylpentene, fluororesins, polycarbonates and polyarylene sulfides are more preferable. The heat-resistant resin can be composed of not only a single resin component but also pluralities of resin components.

(a) Polyesters

The polyesters include polybutylene terephthalate (PBT, melting point: about 160 to 230° C.), polyethylene terephthalate (PET, melting point: about 230 to 270° C.), polyethylene naphthalate (melting point: 272° C.), polybutylene naphthalate (melting point: 245° C.), etc., and PBT is preferable.

The PBT is essentially a saturated polyester composed of 1,4-butanediol and terephthalic acid. Within ranges not deteriorating properties such as heat resistance, compression resistance, heat shrinkage resistance, etc., other diols than 1,4-butanediol and other carboxylic acids than terephthalic acid can be included as comonomers. Such diols can be, for instance, ethylene glycol, diethylene glycol, neopentyl glycol, 1,4-cyclohexanemethanol, etc. The dicarboxylic acids can be, for instance, isophthalic acid, sebacic acid, adipic acid, azelaic acid, succinic acid, etc. PBT can be composed of not only a single component but also pluralities of PBT resin components. PBT particularly has Mw of $2×10^4$ to $3×10^5$.

(b) Polyamides

The polyamides are preferably polyamide 6 (6-nylon), polyamide 66 (6,6-nylon), polyamide 12 (12-nylon) and amorphous polyamide.

(c) Polymethylpentene

The polymethylpentene (PMP) is essentially a polyolefin composed of any one of 4-methyl-1-pentene, 2-methyl-1-pentene, 2-methyl-2-pentene, 3-methyl-1-pentene and 3-methyl-2-pentene, preferably a homopolymer of 4-methyl-1-pentene. PMP can be a copolymer containing a small amount of other α-olefin(s) than methylpentene within a range not deteriorating properties such as heat resistance, compression resistance, heat shrinkage resistance, etc. The other α-olefins than methylpentene are suitably ethylene, propylene, butene-1, pentene-1, hexene-1, octene-1, vinyl acetate, methyl methacrylate, styrene, etc. PMP usually has a melting point of 230 to 245° C. PMP particularly has Mw of $3×10^5$ to $7×10^5$.

(d) Fluororesins

The fluororesins include polyvinylidene fluoride (PVDF, melting point: 171° C.), polytetrafluoroethylene (melting point: 327° C.), a tetrafluoroethylene-perfluoroalkylvinyl ether copolymer (melting point: 310° C.), a tetrafluoroethylene-hexafluoropropylene-perfluoro(propylvinyl ether) copolymer (melting point: 295° C.), a tetrafluoroethylene-hexafluoropropylene copolymer (melting point: 275° C.), an ethylene-tetrafluoroethylene copolymer (melting point: 270° C.), etc.

The preferred fluororesin is PVDF. PVDF can be a copolymer with other olefin(s) (vinylidene fluoride copolymer). The vinylidene fluoride content in the vinylidene fluoride copolymer is preferably 75% or more by mass, more preferably 90% or more by mass. Monomers copolymerizable with vinylidene fluoride include hexafluoropropylene, tetrafluoroethylene, trifluoropropylene, ethylene, propylene, isobutylene, styrene, vinyl chloride, vinylidene chloride, difluorochloroethylene, vinyl formate, vinyl acetate, vinyl propionate, vinyl butyrate, acrylic acid and its salt, methyl methacrylate, allyl methacrylate, acrylonitrile, methacrylonitrile, N-butoxymethyl acrylamide, allyl acetate, isopropenyl acetate, etc. The vinylidene fluoride copolymer is preferably a poly(hexafluoropropylene-vinylidene fluoride) copolymer.

(e) Polycarbonates

The polycarbonate (PC) is preferably bisphenol-A-type PC. The bisphenol-A-type PC can be produced by (i) a transesterification reaction method of bisphenol A with diphenyl carbonate without a solvent (transesterification method), (ii) a method of subjecting bisphenol A and phosgene to an acid-removing polycondensation reaction in the presence of an acid-bonding agent in a solvent (phosgene method), or (iii) a method of adding phosgene to a suspension composed of an aqueous solution of bisphenol A and an alkali and an organic solvent, thereby causing a reaction in an interface between a water phase and an organic solvent phase (interface polycondensation method). The PC preferably has Mw of $2×10^4$ to $4×10^4$.

(f) Polyarylene Sulfides

Preferable as the polyarylene sulfide is polyphenylene sulfide (PPS, melting point: 285° C.), which can be linear or branched.

(3) Inorganic Fillers

The polypropylene/heat-resistant resin mixed layer can contain inorganic filler. The inorganic filler can be silica, alumina, silica-alumina, zeolite, mica, clay, kaolin, talc, calcium carbonate, calcium oxide, calcium sulfate, barium carbonate, barium sulfate, magnesium carbonate, magnesium sulfate, magnesium oxide, diatomaceous earth, glass powder, aluminum hydroxide, titanium dioxide, zinc oxide, satin white, acid clay, etc. Two or more types of the inorganic filler can be combined.

Inorganic filler particles are not critical in shape. For instance, spherical or crushed inorganic filler can be properly used. The inorganic filler can be surface-treated. Surface-treating agents for the inorganic filler include, for instance, silane coupling agents, aliphatic acids (stearic acid, etc.) or their derivatives, etc.

The inclusion of the heat-resistant resin and the inorganic filler improves the permeability. This appears to be due to the fact that the cleavage of polypropylene fibrils starts not only from the heat-resistant resin but also from the inorganic filler particles as nuclei to provide creased voids (pores), thereby increasing the gap (pore) volume.

(4) Formulation

The content of the heat-resistant resin is preferably 3 to 30% by mass, more preferably 5 to 25% by mass, based on the total (100% by mass) of polypropylene and the heat-resistant resin. When this content is less than 3% by mass, a good balance of porosity and air permeability cannot be achieved. When this content exceeds 30% by mass, the pin puncture strength, tensile rupture strength and flatness of the membrane are lowered. The content of the inorganic filler is preferably 0.1 to 15% by mass, more preferably 0.5 to 10% by mass, based on the total (100% by mass) of polypropylene and the heat-resistant resin.

(5) Function of Polypropylene/Heat-Resistant Resin Mixed Layer

The polypropylene/heat-resistant resin mixed layer imparts excellent permeability, mechanical strength, heat shrinkage resistance, meltdown properties and compression resistance to the multi-layer, microporous polyolefin membrane.

(C) Examples of Layer Structure

What is required to the first multi-layer, microporous polyolefin membrane is that it comprises at least one polyethylene resin layer A and at least one polypropylene/heat-resistant resin mixed layer B. When it comprises pluralities of the polyethylene resin layer A or the polypropylene/heat-resistant resin mixed layer B, the same type of layers can have the same or different compositions. Combinations of the microporous layers include A/B, A/B/A, B/A/B, etc. When used as a battery separator, it comprises two polyethylene resin layers A as outer layers, and a polypropylene/heat-resistant resin mixed layer B as an inner layer, for instance, in a layer structure of A/B/A, etc., to have a particularly improved balance of shutdown properties, permeability and mechanical strength.

(D) Ratio of Polyethylene Resin Layer to Polypropylene/Heat-Resistant Resin Mixed Layer Though not critical, the thickness ratio (A/B) of the polyethylene resin layer A to the polypropylene/heat-resistant resin mixed layer B is preferably 70/30 to 10/90, more preferably 60/40 to 20/80.

[2] Second Multi-Layer, Microporous Polyolefin Membrane

The second multi-layer, microporous polyolefin membrane comprises a polyethylene resin layer, and a microporous layer made of polypropylene and inorganic filler having an aspect ratio of 2 or more (hereinafter referred to as "polypropylene/inorganic filler mixed layer" unless otherwise mentioned).

(A) Polyethylene Resin Layer

Because the polyethylene resin can be the same as in the first multi-layer, microporous polyolefin membrane, its description will be omitted. The function of the polyethylene resin layer is the same as in the first multi-layer, microporous polyolefin membrane.

(B) Polypropylene/Inorganic Filler Mixed Layer (1) Polypropylene

Because the polypropylene used can be the same as in the first multi-layer, microporous polyolefin membrane, its description will be omitted.

(2) Inorganic Filler

The second multi-layer, microporous polyolefin membrane comprises inorganic filler having an aspect ratio of 2 or more as an indispensable component. The addition of the inorganic filler having an aspect ratio of 2 or more to polypropylene provides a polypropylene-containing microporous layer with improved porosity, permeability, mechanical strength and meltdown properties. The aspect ratio of the inorganic filler is preferably 4 or more, more preferably 8 or more. The aspect ratio is determined by measuring the longer and shorter axes of 100 or more inorganic filler particles in a photomicrograph of the inorganic filler remaining after burning the second multi-layer, microporous polyolefin membrane, and averaging the measured longer axis/shorter axis ratios.

The inorganic fillers having an aspect ratio of 2 or more includes glass fibers, carbon fibers, dawsonite, mica, talc, aluminum hydroxide, etc. These inorganic fillers can be used alone or in combination. These inorganic fillers can be treated with the above surface-treating agents. The diameter of a circle corresponding to the inorganic filler having an aspect ratio of 2 or more (the diameter of a circle having the same area as that of the area of an inorganic filler particle in a photomicrograph) is preferably 0.1 to 100 µm, more preferably 0.5 to 15 µm.

(3) Heat-Resistant Resins

The polypropylene/inorganic filler mixed layer can contain the above heat-resistant resins.

(4) Formulation

The inorganic filler content is preferably 0.1 to 15% by mass, more preferably 0.5 to 10% by mass, based on 100% by mass of the resin component, which is only polypropylene or a mixture of polypropylene and the heat-resistant resin, in the polypropylene/inorganic filler mixed layer. When the inorganic filler content is less than 0.1% by mass, the membrane has insufficient mechanical strength. On the other hand, when it is more than 15% by mass, the multi-layer, microporous membrane has low pin puncture strength, and an increased amount of inorganic filler is detached when slitting the multi-layer, microporous membrane. With a large amount of the inorganic filler powder detached, products formed by the multi-layer, microporous membrane are likely to have defects such as pinholes, spots, etc.

When the polypropylene/inorganic filler mixed layer contains the heat-resistant resin, the heat-resistant resin content is preferably 3 to 30% by mass, more preferably 5 to 25% by mass, based on 100% by mass of the total of polypropylene and the heat-resistant resin.

(5) Function of Polypropylene/Inorganic Filler Mixed Layer

The polypropylene/inorganic filler mixed layer imparts excellent permeability, mechanical strength, heat shrinkage resistance and meltdown properties to the multi-layer, microporous polyolefin membrane.

(C) Examples of Layer Structure

What is required to the second multi-layer, microporous polyolefin membrane is that it comprises at least one polyethylene resin layer A' and at least one polypropylene/inorganic filler mixed layer B'. When the second multi-layer, microporous polyolefin membrane comprises pluralities of polyethylene resin layers A' or pluralities of polypropylene/inorganic filler mixed layers B', the same types of layers can have the same or different compositions. Combinations of the microporous layers include A'/B', A'/B'/A', B'/A'/B', etc. When used as a battery separator, it comprises two polyethylene resin layers A' as outer layers, and a polypropylene/inorganic filler mixed layer B' as an inner layer, for instance, in a layer structure of A'/B'/A', etc., to have a particularly improved balance of shutdown properties, permeability and mechanical strength.

(D) Ratio of Polyethylene Resin Layer to Polypropylene/Inorganic Filler Mixed Layer Though not critical, the thickness ratio (A'/B') of the polyethylene resin layer A' to the polypropylene/inorganic filler mixed layer B' is preferably 70/30 to 10/90, more preferably 60/40 to 20/80.

[3] Production Method of First Multi-Layer, Microporous Polyolefin Membrane (A) First Production Method The first method for producing the first multi-layer, microporous polyolefin membrane comprises the steps of (1) (a) melt-blending the polyethylene resin and a membrane-forming solvent to prepare a polyethylene solution, (b) melt-blending polypropylene, the heat-resistant resin and a membrane-forming solvent to prepare a polypropylene/heat-resistant resin mixture solution, (2) simultaneously extruding the polyethylene solution and the polypropylene/heat-resistant resin mixture solution through a die, (3) cooling the resultant extrudate to provide a gel-like laminate sheet, (4) removing the membrane-forming solvent, and (5) drying the resultant membrane. If necessary, a stretching step (6), a hot solvent treatment step (7), etc. can be added between the steps (3) and (4), and a step (8) of stretching the multi-layer, microporous membrane, a heat treatment step (9), a hot solvent treatment step (10), a cross-linking step (11) with ionizing radiations, a hydrophilizing step (12), a surface-coating step (13), etc. can be conducted after the step (5).

(1) Preparation of Polyethylene Solution and Polypropylene/Heat-Resistant Resin Mixture Solution (a) Preparation of Polyethylene Solution The polyethylene resin is melt-blended with an appropriate membrane-forming solvent to prepare a polyethylene solution. The polyethylene solution can contain various additives such as antioxidants, etc. within ranges not deteriorating the effects of the present invention, if necessary. For instance, fine silica powder can be added as a pore-forming agent.

The membrane-forming solvent is preferably liquid at room temperature. The use of a liquid solvent enables stretching at a relatively high magnification. The liquid solvents can be linear or cyclic aliphatic hydrocarbons such as nonane, decane, decalin, p-xylene, undecane, dodecane, liquid paraffin, etc.; mineral oil distillates having boiling points corresponding to those of the above hydrocarbons; and phthalates liquid at room temperature, such as dibutyl phthalate, dioctyl phthalate, etc. To obtain a gel-like sheet having a stable liquid solvent content, it is preferable to use non-volatile liquid solvents such as liquid paraffin. Also, a solvent miscible with polyethylene in melt blending but solid at room temperature can be added to the liquid solvent. Such solid solvents are stearyl alcohol, ceryl alcohol, paraffin wax, etc. However, the use of only a solid solvent results in the likelihood of uneven stretching, etc.

The viscosity of the liquid solvent is preferably 30 to 500 cSt, more preferably 30 to 200 cSt, at 25° C. When the viscosity at 25° C. is less than 30 cSt, foaming easily occurs, resulting in difficulty in blending. The viscosity of more than 500 cSt makes the removal of the liquid solvent difficult.

Though not particularly critical, the uniform melt blending of the polyethylene solution is preferably conducted in a double-screw extruder. Melt blending in a double-screw extruder is suitable for providing a high-concentration polyethylene solution. Regardless of whether the polyethylene resin is in any type described above, the melt-blending temperature is preferably in a range from $Tm_1+10°$ C. to $Tm_1+100°$ C., wherein $Tm_1$ is the melting point of the polyethylene resin. The melting point $Tm_1$ of the polyethylene resin corresponds to that of (a) ultra-high-molecular-weight polyethylene, (b) the other polyethylene than the ultra-high-molecular-weight polyethylene or (c) the polyethylene composition when the polyethylene resin is any one of (a) to (c), or that of any one of (a) to (c) contained in (d) the polyolefin composition when the polyethylene resin is the polyolefin composition. Each of the ultra-high-molecular-weight polyethylene, the other polyethylene than the ultra-high-molecular-weight polyethylene, and the polyethylene composition has a melting point of about 130 to 140° C. Accordingly, the melt-blending temperature is preferably 140 to 250° C., more preferably 170 to 240° C. The membrane-forming solvent can be added before starting the melt blending, or charged into the double-screw extruder at an intermediate position during the melt blending, though the latter is preferable. In the melt blending, an antioxidant is preferably added to prevent the oxidization of the polyethylene resin.

A ratio L/D, in which L and D respectively represent the length and diameter of a screw in the double-screw extruder, is preferably 20 to 100, more preferably 35 to 70. When L/D is less than 20, enough melt blending is not achieved. When L/D is more than 100, there is too much residence time for the polyethylene solution. A cylinder of the double-screw extruder preferably has an inner diameter of 40 to 80 mm.

The polyethylene resin content is preferably 10 to 50% by mass, more preferably 20 to 45% by mass, based on 100% by mass of the polyethylene solution. Less than 10% by mass of the polyethylene resin content causes large swelling and neck-in at the die exit in the extrusion, resulting in decrease in the formability and self-supportability of the extrudate. More than 50% by mass of the polyethylene resin content deteriorates the formability of the extrudate.

(b) Preparation of Polypropylene/Heat-Resistant Resin Mixture Solution

The polypropylene/heat-resistant resin mixture solution is prepared by adding the membrane-forming solvent to polypropylene and the heat-resistant resin, and melt-blending them. The polypropylene/heat-resistant resin mixture solution can be prepared in the same manner as the polyethylene solution, except that the melt-blending temperature is preferably equal to or higher than the melting point of the crystalline heat-resistant resin or the Tg of the amorphous heat-resistant resin depending on the type of the heat-resistant resin, that the resin content (polypropylene+heat-resistant resin) in the solution is preferably 10 to 60% by mass.

When the resin content in the polypropylene/heat-resistant resin mixture solution is less than 10% by mass, large swelling and neck-in occur at the die exit in the formation of a gel-like laminate sheet, thereby providing the extrudate with poor formability and self-supportability. When the resin content in the solution exceeds 60% by mass, the porosity is extremely low after stretching. The resin content in the polypropylene/heat-resistant resin mixture solution is more preferably 20 to 50% by mass.

With the melt-blending temperature equal to or higher than the melting point of the crystalline heat-resistant resin or the Tg of the amorphous heat-resistant resin, the heat-resistant resin is dispersed in the form of fine particles in the polypropylene in the subsequent cooling step for forming a gel-like laminate sheet. The melt-blending temperature is more preferably in a range from the melting point of the crystalline heat-resistant resin or the Tg of the amorphous heat-resistant resin to the melting point of the polypropylene+100° C. Usual polypropylene has a melting point of 155 to 175° C. For instance, when a polyamide having a melting point of 215 to 265° C. is used as the heat-resistant resin, the melt-blending temperature is preferably 215 to 270° C. When PBT having a melting point of about 160 to 230° C. is used as the heat-resistant resin, the melt-blending temperature is preferably 160 to 270° C., more preferably 180 to 270° C. When PET having a melting point of about 230 to 270° C. is used as the heat-resistant resin, the melt-blending temperature is preferably 230 to 270° C.

(2) Extrusion

The polyethylene solution and the polypropylene/heat-resistant resin mixture solution are supplied from extruders to one or more dies, from which they are extruded simultaneously. In the simultaneous extrusion of both solutions, both solutions are combined in a laminar manner in one die and then simultaneously extruded in a sheet form from the die (bonding inside the die). In this case, one die is connected to pluralities of extruders. When both solutions are extruded in a sheet form from separate dies and then laminated (bonding outside the die), each die is connected to each of plural extruders. The bonding inside the die is preferable.

In the simultaneous extrusion, any of a flat-die method and an inflation method can be used. To achieve the bonding inside the die in either method, a method of supplying each solution to each of manifolds connected to a multi-layer-forming die and laminating them in a laminar manner at a die lip (multi-manifold method), or a method of laminating the solutions in a laminar manner and then supplying the resultant laminate to a die (block method) can be used. Because the multi-manifold method and the block method per se are known, their detailed description will be omitted. A known multi-layer-forming, flat or inflation die can be used. The multi-layer-forming flat die preferably has a gap of 0.1 to 5 mm. When bonding is conducted outside the die by the flat die method, sheet-shaped solutions extruded through the dies are laminated under pressure between a pair of rolls. In any method described above, the die is heated at a temperature of 140 to 250° C. during extrusion. The extrusion speed of the heated solution is preferably 0.2 to 15 m/minute. The ratio of the polyethylene resin layer to the polypropylene/heat-resistant resin mixed layer can be controlled by adjusting the amounts of the polyethylene solution and the polypropylene/heat-resistant resin mixture solution extruded.

(3) Formation of Gel-Like Laminate Sheet

The resultant laminar extrudate is cooled to provide a gel-like laminate sheet. The cooling is preferably conducted to at least a gelation temperature at a speed of 50° C./minute or more. Such cooling can fix the micro-phase separation of a polyethylene resin phase and a polypropylene/heat-resistant resin mixture phase by the membrane-forming solvent. The cooling is preferably conducted to 25° C. or lower. In general, a lower cooling speed provides the gel-like laminate sheet with a coarser high-order structure, and larger pseudo-cell units constituting the high-order structure, while a higher cooling speed provides denser cell units. The cooling speed of less than 50° C./minute increases crystallization, making it difficult to form a stretchable gel-like laminate sheet. The cooling method can be a method of bringing the extrudate into direct contact with a cooling medium such as a cooling air, a cooling water, etc., a method of bring the extrudate into contact with a cooling roll, etc.

(4) Removal of Membrane-Forming Solvent

The membrane-forming solvent is removed (washed away) using a washing solvent. Because the polyethylene resin phase and the polypropylene/heat-resistant resin mixture phase are separated from the membrane-forming solvent phase, the removal of the membrane-forming solvent provides a microporous membrane composed of fibrils constituting a fine, three-dimensional network structure, which has three-dimensionally irregularly communicating pores (voids). The washing solvents can be volatile solvents, for instance, saturated hydrocarbons such as pentane, hexane, heptane, etc.; chlorinated hydrocarbons such as methylene chloride, carbon tetrachloride, etc.; ethers such as diethyl ether, dioxane, etc.; ketones such as methyl ethyl ketone, etc.; linear fluorocarbons such as trifluoroethane, $C_6F_{14}$, $C_7F_{16}$, etc.; cyclic hydrofluorocarbons such as $C_5H_3F_7$, etc.; hydrofluoroethers such as $C_4F_9OCH_3$, $C_4F_9OC_2H_5$, etc.; and perfluoroethers such as $C_4F_9OCF_3$, $C_4F_9OC_2F_5$, etc. These washing solvents have a low surface tension, for instance, 24 mN/m or less at 25° C. The use of a washing solvent having a low surface tension suppresses a pore-forming network structure from shrinking due to a surface tension of gas-liquid interfaces during drying after washing, thereby providing a multi-layer, microporous membrane having high porosity and permeability.

The washing of the gel-like laminate sheet can be conducted by the immersion or showering of a washing solvent or their combination. The washing solvent used is preferably 300 to 30,000 parts by mass per 100 parts by mass of the membrane. The washing temperature can usually be 15 to 30° C., and heat-washing is conducted, if necessary. The heat-washing temperature is preferably 80° C. or lower. Washing with the washing solvent is preferably conducted until the amount of the remaining liquid solvent becomes less than 1% by mass of that added.

(5) Drying of Membrane

The multi-layer, microporous membrane obtained by removing the membrane-forming solvent is dried by a heat-drying method, a wind-drying method, etc. The drying temperature is preferably equal to or lower than the crystal dispersion temperature $Tcd_1$ of the polyethylene resin, particularly 5° C. or more lower than the $Tcd_1$. The crystal dispersion temperature $Tcd_1$ of the polyethylene resin corresponds to that of (a) the ultra-high-molecular-weight polyethylene, (b) the other polyethylene than the ultra-high-molecular-weight polyethylene or (c) the polyethylene composition when the polyethylene resin is any one of (a) to (c), or that of any one of (a) to (c) contained in (d) the polyolefin composition when the polyethylene resin is the polyolefin composition. The crystal dispersion temperature is determined by measuring the temperature characteristics of dynamic viscoelasticity according to ASTM D 4065. The ultra-high-molecular-weight polyethylene, the other polyethylene than the ultra-high-molecular-weight polyethylene, and the polyethylene composition have crystal dispersion temperatures of about 90 to 100° C.

Drying is conducted until the percentage of the remaining washing solvent becomes preferably 5% or less by mass, more preferably 3% or less by mass, based on 100% by mass (on a dry weight basis) of the multi-layer, microporous membrane. If drying were insufficient, the subsequent re-stretching and heat treatment would undesirably provide the multi-layer, microporous membrane with reduced porosity and permeability.

(6) Stretching

The unwashed gel-like laminate sheet is preferably stretched. After heating, the gel-like laminate sheet is preferably stretched to a predetermined magnification by a tenter method, a roll method, an inflation method, a rolling method, or combination thereof. Because the gel-like laminate sheet contains the membrane-forming solvent, uniform stretching can be conducted. The stretching provides the membrane with improved mechanical strength and enlarged pores, particularly preferable when used as a battery separator. Although the stretching can be monoaxial or biaxial, biaxial stretching is preferable. The biaxial stretching can be simultaneous biaxial stretching, sequential stretching, or multi-stage stretching (for instance, a combination of simultaneous biaxial stretching and sequential stretching), though the simultaneous biaxial stretching is preferable.

In the case of monoaxial stretching, the stretching magnification is preferably 2-fold or more, more preferably 3- to 30-fold. In the case of biaxial stretching, the stretching magnification is 3-fold or more in both directions, with an area magnification of preferably 9-fold or more, more preferably 25-fold or more. When the area magnification is less than 9-fold, stretching is insufficient, failing to obtain a high-modulus, high-strength, multi-layer, microporous membrane. When the area magnification is more than 400-fold, there are restrictions in stretching apparatuses, stretching operations, etc.

The stretching temperature is preferably the melting point $Tm_1$ of the polyethylene resin+10° C. or lower, more preferably in a range of the crystal dispersion temperature $Tcd_1$ or higher and lower than the melting point $Tm_1$. When this stretching temperature is higher than the melting point $Tm_1$+ 10° C., the polyethylene resin is melted, failing to orient molecular chains of the polyethylene resin by stretching. When the stretching temperature is lower than the crystal dispersion temperature $Tcd_1$, the polyethylene resin is so insufficiently softened that rupture is likely to occur in stretching, thus failing to achieve high-magnification stretching. The polyethylene resin has a crystal dispersion temperature of about 90 to 100° C. as described above. Accordingly, the stretching temperature is usually 90 to 140° C., preferably 100 to 130° C.

The above stretching generates cleavage in polyethylene lamellas, thereby making a polyethylene phase (made of the ultra-high-molecular-weight polyethylene, the other polyethylene or the polyethylene composition) finer to form large numbers of fibrils. The resultant fibrils constitute a three-dimensional network structure (three-dimensionally and irregularly connected network structure). In the layer containing the polypropylene/heat-resistant resin mixture, fibrils are cleft with fine particles of the heat-resistant resin as nuclei, thereby forming creased pores holding fine particles.

Depending on the desired properties, stretching can be conducted with a temperature distribution in a thickness direction to provide a multi-layer, microporous membrane with excellent mechanical strength. The details of that method are described in Japanese Patent 3,347,854.

(7) Hot Solvent Treatment

A treatment of bringing the gel-like laminate sheet into contact with a hot solvent can be conducted. The hot solvent treatment turns fibrils formed by stretching to a leaf-vein-like form with relatively thick trunks, resulting in a multi-layer, microporous membrane with a large pore size and excellent strength and permeability. The leaf-vein-like fibrils comprise thick trunk fibers and thin branch fibers extending therefrom, which is entangled to form a complicated network. The details of the hot solvent treatment are described in WO 2000/20493.

(8) Stretching of Multi-Layer, Microporous Membrane

The dried multi-layer, microporous membrane can be stretched in at least one direction. The stretching of the multi-layer, microporous membrane can be conducted by a tenter method, etc. while heating in the same manner as described above. This stretching can be monoaxial or biaxial. The biaxial stretching can be simultaneous biaxial stretching or sequential stretching, though the simultaneous biaxial stretching is preferable.

The stretching temperature is preferably the melting point $Tm_1$ or lower, more preferably in a range from the crystal dispersion temperature $Tcd_1$ to the melting point $Tm_1$. When the stretching temperature is higher than the melting point $Tm_1$, the resultant membrane has low compression resistance, and there is large unevenness in properties (particularly, air permeability) in a width direction when stretched in a transverse direction (TD). When the stretching temperature is lower than the crystal dispersion temperature $Tcd_1$, the polyethylene resin is so insufficiently softened that rupture is likely to occur in stretching, thus failing to achieve uniform stretching. Specifically, the stretching temperature is usually 90 to 135° C., preferably 95 to 130° C.

The stretching magnification in one direction is preferably 1.1- to 2.5-fold, to provide the multi-layer, microporous membrane with larger pore diameters and improved compression resistance. In the case of monoaxial stretching, for instance, the stretching magnification is 1.1- to 2.5-fold in either a longitudinal direction (MD) or TD. In the case of biaxial stretching, the stretching magnification is 1.1- to 2.5-fold in both MD and TD. In the biaxial stretching, the stretching magnification can be the same or different between MD and TD as long as it is 1.1- to 2.5-fold, though it is preferable the same between MD and TD. When this magnification is less than 1.1-fold, sufficient compression resistance cannot be obtained. When this magnification is more than 2.5-fold, the membrane is highly likely broken and has undesirably low heat shrinkage resistance. The stretching magnification is more preferably 1.1- to 2.0-fold.

(9) Heat Treatment

The dried multi-layer, microporous polyethylene membrane is preferably heat-treated. The heat treatment stabilizes crystals, thereby making lamellas more uniform. The heat treatment can be heat-setting and/or annealing. The heat-setting is conducted more preferably by a tenter method, a roll method or a rolling method. The heat-setting is conducted at the melting point $Tm_1$+10° C. or lower, preferably at a temperature in a range from the crystal dispersion temperature $Tcd_1$ to the melting point $Tm_1$.

The annealing can be conducted using a belt conveyer or an air-floating furnace in addition to the above method. The annealing is conducted at the melting point $Tm_1$ or lower, preferably at a temperature in a range from 60° C. to the melting point $Tm_1$-10° C. The above annealing provides a multi-layer, microporous membrane having high permeability and strength. The heat-setting and the annealing can be combined in many steps.

(10) Cross-Linking of Membrane

The dried multi-layer, microporous membrane is preferably cross-linked by ionizing radiation such as α-rays, β-rays, γ-rays, electron beams, etc. The electron beam irradiation is preferably conducted at 0.1 to 100 Mrad and accelerating voltage of 100 to 300 kV. The cross-linking treatment elevates the meltdown temperature of the multi-layer, microporous membrane.

(11) Hydrophilizing

The dried multi-layer, microporous membrane can be hydrophilized. The hydrophilizing can be conducted by a monomer-grafting treatment, a surfactant treatment, a corona discharge treatment, etc. The monomer-grafting treatment is preferably conducted after the cross-linking.

In case of the surfactant treatment, any of nonionic surfactants, cationic surfactants, anionic surfactants and amphoteric surfactants can be used, but the nonionic surfactants are preferable. The multi-layer, microporous membrane is dipped in a solution of the surfactant in water or a lower alcohol such as methanol, ethanol, isopropyl alcohol, etc., or coated with the solution by a doctor blade method.

(12) Surface-Coating

The dried multi-layer, microporous membrane can be coated with porous polypropylene, a porous fluororesin such as polyvinylidene fluoride and polytetrafluoroethylene, porous polyimide, porous polyphenylene sulfide, etc., to improve meltdown properties when used as a battery separator. Polypropylene for a coating layer preferably has Mw of 5,000 to 500,000 and solubility of 0.5 g or more in 100 g of toluene at a temperature of 25° C. This polypropylene more preferably has a racemic diad fraction of 0.12 to 0.88. In the racemic diad, two connected monomer units are in an enantiomer relation. The surface-coating layer can be formed, for instance, by coating the multi-layer, microporous membrane with a mixed solution containing a resin for the above coating layer and its good solvent, removing the good solvent to increase the concentration of the resin, thereby forming a structure in which a resin phase is separated from a good solvent phase, and then removing the remaining good solvent.

(B) Second Production Method

The second method for producing the first multi-layer, microporous polyolefin membrane comprises the steps of (1) preparing a polyethylene solution and a polypropylene/heat-resistant resin mixture solution in the same manner as in the first method, (2) extruding the polyethylene solution and the polypropylene/heat-resistant resin mixture solution through separate dies, (3) cooling the resultant extrudates to provide gel-like sheets, (4) laminating the gel-like sheets, (5) removing the membrane-forming solvent, and (6) drying the resultant laminate membrane. If necessary, a stretching step (7), a hot solvent treatment step (8), etc. can be conducted between the steps (3) and (4), a stretching step (9), a hot solvent treatment step (10), etc. can be conducted between the steps (4) and (5), and a step (11) of stretching the multi-layer, microporous membrane, a heat treatment step (12), a hot solvent treatment step (13), a cross-linking step (14) with ionizing radiations, a hydrophilizing step (15), a surface-coating step (16), etc. can be conducted after the step (6). Among the above steps, the step (1) can be the same as in the first method, the step (2) can be the same as in the first method except that the polyethylene solution and the polypropylene/heat-resistant resin mixture solution are extruded through separate dies, the step (3) can be the same as in the first method except for forming separate gel-like sheets, and the steps (5) and (6) can be the same as in the first method.

The step (4) of laminating a gel-like sheet A composed of the polyethylene resin and the membrane-forming solvent and a gel-like sheet B composed of the polypropylene/heat-resistant resin mixture and the membrane-forming solvent will be described below. Though not particularly critical, the laminating method is preferably a heat-laminating method. The heat-laminating method includes a heat-sealing method, an impulse-sealing method, an ultrasonic laminating method, etc., though the heat-sealing method is preferable. The heat-sealing method preferably uses a heat roll. In the heat roll method, overlapped gel-like sheets A and B pass through a pair of heat rolls or between a heat roll and a table to be heat-sealed. The heat-sealing temperature and pressure are not particularly critical, as long as the gel-like sheets are sufficiently bonded to provide a multi-layer, microporous membrane with enough properties. The heat-sealing temperature is, for instance, 90 to 135° C., preferably 90 to 115° C. The heat-sealing pressure is preferably 0.01 to 50 MPa. The ratio of the polyethylene resin layer A to the polypropylene/heat-resistant resin mixture layer B can be controlled by adjusting the thickness of each gel-like sheet A, B.

The stretching step (7) and the hot solvent treatment step (8) between the steps (3) and (4) can be the same as in the first method except that these steps are conducted on any one of the gel-like sheets A and B. In the stretching step (7), the stretching temperature is preferably the melting point $Tm_1$+ 10° C. or lower, more preferably in a range of the crystal dispersion temperature $Tcd_1$ or more and lower than the melting point $Tm_1$ when the gel-like sheet A is stretched. It is preferably the melting point $Tm_2$ of polypropylene+10° C. or lower, more preferably in a range of the crystal dispersion temperature $Tcd_2$ of polypropylene or more and lower than the melting point $Tm_2$ when the gel-like sheet B is stretched. The crystal dispersion temperature of polypropylene is usually about 100 to 110° C.

The stretching step (9) and the hot solvent treatment step (10) between the steps (4) and (5) can be the same as in the first method. Any of the step (11) of stretching the multi-layer, microporous membrane, the heat treatment step (12), the hot solvent treatment step (13), the cross-linking step (14) with ionizing radiations, the hydrophilizing step (15), and the surface-coating step (16), which is conducted after the step (6), can be the same as in the first method.

(C) Third Production Method

The third method for producing the first multi-layer, microporous polyolefin membrane comprises the steps of (1) preparing a polyethylene solution and a polypropylene/heat-resistant resin mixture solution in the same manner as in the first method, (2) extruding the polyethylene solution and the polypropylene/heat-resistant resin mixture solution through separate dies, (3) cooling the resultant extrudates to provide gel-like sheets, (4) removing a membrane-forming solvent from each gel-like sheet, (5) drying the resultant microporous polyethylene membrane and the resultant microporous polypropylene membrane, and (6) laminating them. If necessary, a stretching step (7), a hot solvent treatment step (8), etc. can be conducted between the steps (3) and (4), a step (9) of stretching the microporous membrane, a heat treatment step (10), a hot solvent treatment step (11), etc. can be conducted between the steps (5) and (6), and a step (12) of stretching the multi-layer, microporous membrane, a heat treatment step (13), a hot solvent treatment step (14), a cross-linking step (15) with ionizing radiations, a hydrophilizing step (16), a surface-coating step (17), etc. can be conducted after the step (6).

Among the above steps, the step (1) can be the same as in the first method, the step (2) can be the same as in the first method except for extruding a polyethylene solution and a polypropylene/heat-resistant resin mixture solution through separate dies, the step (3) can be the same as in the first method except for forming separate gel-like sheets, the step (4) can be the same as in the first method except for removing a membrane-forming solvent from separate gel-like sheets, and the step (5) can be the same as in the first method except for drying separate microporous membranes.

The step (6) of laminating the microporous polyethylene membrane and the microporous polypropylene membrane will be described. Though not particularly critical, the laminating method is preferably a heat-laminating method like in the lamination of the gel-like sheets in the second method, and a heat-sealing method is particularly preferable. The heat-sealing temperature is, for instance, 90 to 135° C., preferably 90 to 115° C. The heat-sealing pressure is preferably 0.01 to 50 MPa.

The stretching step (7) and the hot solvent treatment step (8) between the steps (3) and (4) can be the same as in the second method. The step (9) of stretching the microporous membrane, the heat treatment step (10) and the hot solvent treatment step (11) between the steps (5) and (6) can be the same as in the first method except that they are conducted on the microporous polyethylene membrane and the microporous polypropylene membrane. In the step (9) of stretching the microporous membrane between the steps (5) and (6), the stretching temperature is preferably the melting point $Tm_1$ or lower, more preferably in a range from the crystal dispersion temperature $Tcd_1$ to the melting point $Tm_1$, when the microporous polyethylene membrane is stretched. It is preferably the melting point $Tm_2$ or lower, more preferably in a range from the crystal dispersion temperature $Tcd_2$ to the melting point $Tm_2$, when the microporous polypropylene membrane is stretched.

The heat treatment step (10) between the steps (5) and (6) is conducted at the melting point $Tm_1+10°$ C. or lower, preferably at a temperature in a range from the crystal dispersion temperature $Tcd_1$ to the melting point $Tm_1$, when the microporous polyethylene membrane is heat-set. When the microporous polyethylene membrane is annealed, it is conducted at the melting point $Tm_1$ or lower, preferably at a temperature in a range from 60° C. to the melting point $Tm_1-10°$ C. When the microporous polypropylene membrane is heat-set, it is conducted at the melting point $Tm_2+10°$ C. or lower, preferably at a temperature in a range from the crystal dispersion temperature $Tcd_2$ to the melting point $Tm_2$. When the microporous polypropylene membrane is annealed, it is conducted at the melting point $Tm_2$ or lower, preferably at a temperature in a range from 60° C. to the melting point $Tm_2-10°$ C.

Any of the step (12) of stretching the multi-layer, microporous membrane, the heat treatment step (13), the hot solvent treatment step (14), the cross-linking step (15) with ionizing radiations, the hydrophilizing step (16), and the surface-coating step (17), which is conducted after the step (6), can be the same as in the first method.

[4] Production of Second Multi-Layer, Microporous Polyolefin Membrane (A) First Production Method The first method for producing the second multi-layer, microporous polyolefin membrane comprises the steps of (1) (i) melt-blending the polyethylene resin and a membrane-forming solvent to prepare a polyethylene solution, (ii) dispersing inorganic filler having an aspect ratio of 2 or more in a melt blend of the polypropylene and the membrane-forming solvent to prepare an inorganic-filler-containing polypropylene solution, (2) simultaneously extruding the polyethylene solution and the inorganic-filler-containing polypropylene solution through a die, (3) cooling the resultant extrudate to provide a gel-like laminate sheet, (4) removing the membrane-forming solvent, and (5) drying the resultant membrane. If necessary, a stretching step (6), a hot solvent treatment step (7), etc. can be conducted between the steps (3) and (4), and a step (8) of stretching the multi-layer, microporous membrane, a heat treatment step (9), a hot solvent treatment step (10), a cross-linking step (11) with ionizing radiations, a hydrophilizing step (12), a surface-coating step (13), etc. can be conducted after the step (5).

Because the above steps except for the step (1) (ii) of preparing the inorganic-filler-containing polypropylene solution can be the same as in the first method for producing the first multi-layer, microporous polyolefin membrane, only the step (1) (ii) will be described. The inorganic-filler-containing polypropylene solution is prepared by dispersing the inorganic filler having an aspect ratio of 2 or more in a melt blend of polypropylene and the membrane-forming solvent. The method of preparing the inorganic-filler-containing polypropylene solution is the same as the method of preparing the polyethylene solution, except that the melt-blending temperature is preferably from the melting point $Tm_2$ of polypropylene to $Tm_2+90°$ C., and that the polypropylene content in the solution is preferably 10 to 50% by mass. The polypropylene content in the solution is more preferably 20 to 45% by mass. The inorganic filler is preferably dry-blended with polypropylene in advance.

(B) Second Production Method

The second method for producing the second multi-layer, microporous polyolefin membrane comprises the steps of (1) preparing a polyethylene solution and an inorganic-filler-containing polypropylene solution in the same manner as in the first method, (2) extruding the polyethylene solution and the inorganic-filler-containing polypropylene solution through separate dies, (3) cooling the resultant extrudates to provide gel-like sheets, (4) laminating the gel-like sheets, (5) removing the membrane-forming solvent, and (6) drying the resultant membranes. If necessary, a stretching step (7), a hot solvent treatment step (8), etc. can be conducted between the steps (3) and (4), a stretching step (9), a hot solvent treatment step (10), etc. can be conducted between the steps (4) and (5), and a step (11) of stretching the multi-layer, microporous membrane, a heat treatment step (12), a hot solvent treatment step (13), a cross-linking step (14) with ionizing radiations, a hydrophilizing step (15), a surface-coating step (16), etc. can be conducted after the step (6).

The step (2) can be the same as in the second method for producing the first multi-layer, microporous polyolefin membrane, except for the inorganic-filler-containing polypropylene solution in place of the polypropylene/heat-resistant resin mixture solution. The steps (3) to (16) can be the same as in the second method for producing the first multi-layer, microporous polyolefin membrane. Accordingly, their description will be omitted.

(C) Third Production Method

The third method for producing the second multi-layer, microporous polyolefin membrane comprises the steps of (1) preparing a polyethylene solution and an inorganic-filler-containing polypropylene solution in the same manner as in the first method, (2) extruding the polyethylene solution and the inorganic-filler-containing polypropylene solution through separate dies, (3) cooling the resultant extrudates to provide gel-like sheets, (4) removing a membrane-forming solvent from each gel-like sheet, (5) drying the resultant microporous polyethylene membrane and the resultant microporous polypropylene membrane, and (6) and laminating them. If necessary, a stretching step (7), a hot solvent treatment step (8), etc. can be conducted between the steps (3) and (4), a step (9) of stretching the microporous membrane, a heat treatment step (10), a hot solvent treatment step (11), etc. can be conducted between the steps (5) and (6), and a step (12) of stretching the multi-layer, microporous membrane, a heat treatment step (13), a hot solvent treatment step (14), a cross-linking step (15) with ionizing radiations, a hydrophilizing step (16), a surface-coating step (17), etc. can be conducted after the step (6).

The step (2) can be the same as in the third method for producing the first multi-layer, microporous polyolefin membrane, except for using the inorganic-filler-containing polypropylene solution in place of the polypropylene/heat-resistant resin mixture solution. The steps (3) to (17) can be the same as in the third method for producing the first multi-layer, microporous polyolefin membrane. Accordingly, their description will be omitted.

[5] Properties of Multi-Layer, Microporous Polyolefin Membrane

The first and second multi-layer, microporous polyolefin membranes according to preferred embodiments of this invention have the following properties.

(a) Porosity of 25 to 80%

With the porosity of less than 25%, the multi-layer, microporous polyolefin membrane does not have good air permeability. When the porosity exceeds 80%, the multi-layer, microporous membrane used as a battery separator does not have enough strength, resulting in a high likelihood of short-circuiting between electrodes.

(b) Air Permeability of 20 to 400 Seconds/100 cm³ (Converted to the Value at 20-μm Thickness)

When the air permeability is in a range from 20 to 400 seconds/100 cm³, batteries having separators formed by the multi-layer, microporous polyolefin membrane have large capacity and good cycle characteristics. When the air permeability is more than 400 seconds/100 cm³, batteries have small capacity. When the air permeability is less than 20 seconds/100 cm³, shutdown does not fully occur when the temperature is elevated in the batteries.

(c) Pin Puncture Strength of 3,000 mN/20 μm or More

With the pin puncture strength of less than 3,000 mN/20 μm, a battery comprising the multi-layer, microporous polyolefin membrane as a separator likely suffers short-circuiting between electrodes. The pin puncture strength is preferably 3,500 mN/20 μm or more.

(d) Tensile Rupture Strength of 80,000 kPa or More

With the tensile rupture strength of 80,000 kPa or more in both longitudinal direction (MD) and transverse direction (TD), the membrane is unlikely ruptured when used as a battery separator. The tensile rupture strength is preferably 100,000 kPa or more in both MD and TD.

(e) Tensile Rupture Elongation of 100% or More

With the tensile rupture elongation of 100% or more in both longitudinal direction (MD) and transverse direction-(TD), the membrane is unlikely ruptured when used as a battery separator.

(f) Heat Shrinkage Ratio of 10% or Less

The heat shrinkage ratio after exposed to 105° C. for 8 hours is 10% or less in both longitudinal direction (MD) and transverse direction (TD). When the heat shrinkage ratio exceeds 10%, battery separators formed by the multi-layer, microporous polyolefin membrane shrink by heat generated by the batteries, resulting in high likelihood of short-circuiting in their end portions. The heat shrinkage ratio is preferably 8% or less in both MD and TD.

(g) Shutdown Temperature of 140° C. or Lower

When the shutdown temperature is higher than 140° C., the multi-layer, microporous membrane used as a lithium battery separator has slow shutdown response when overheated.

(h) Meltdown Temperature of 160° C. or Higher

The meltdown temperature is preferably 160 to 190° C.

Particularly, the first multi-layer, microporous polyolefin membrane also has the following properties.

(i) Thickness Change Ratio of 20% or More by Heat Compression

The thickness change ratio by heat compression at 90° C. and a pressure of 5 MPa (51 kgf/cm²) for 5 minutes is 20% or more, based on 100% of the thickness before compression. With the thickness change ratio of 20% or more, a battery separator formed by the microporous membrane can well absorb the expansion of electrodes, resulting in small permeability change when compressed by the electrodes. This thickness change ratio is preferably 25% or more.

(j) Post-Compression Air Permeability of 700 Seconds/100 cm³ or Less

The post-compression air permeability (Gurley value) measured after heat compression under the above conditions is 700 seconds/100 cm³/20 μm or less. With the post-compression air permeability of 700 seconds/100 cm³/20 μm or less, a separator formed by the microporous membrane provides a battery with large capacity and good cycle properties. The post-compression air permeability is preferably 600 seconds/100 cm³/20 μm or less.

[6] Battery Separator

Though properly selectable depending on the types of batteries, the thickness of a battery separator formed by the multi-layer, microporous polyolefin membrane is preferably 5 to 50 μm, more preferably 10 to 35 μm.

This invention will be described in more detail with reference to Examples below without intention of restricting the scope of this invention.

EXAMPLE 1

(1) Preparation of Polyethylene Solution

Dry-blended were 100 parts by mass of a polyethylene (PE) composition comprising 25% by mass of ultra-high-molecular-weight polyethylene (UHMWPE) having a mass-average molecular weight (Mw) of $2.0 \times 10^6$, and 75% by mass of high-density polyethylene (HDPE) having Mw of $3.5 \times 10^5$, with 0.2 parts by mass of tetrakis [methylene-3-(3,5-ditertiary-butyl-4-hydroxyphenyl)-propionate]methane. Measurement revealed that the PE composition of UHMWPE and HDPE had a melting point of 135° C. and a crystal dispersion temperature of 90° C. 30 parts by mass of the resultant mixture was charged into a strong-blending, double-screw extruder having an inner diameter of 58 mm and L/D of 42, and 70 parts by mass of liquid paraffin [35 cSt (40° C.)] was supplied to the double-screw extruder via its side feeder. Melt blending was conducted at 230° C. and 250 rpm to prepare a polyethylene solution.

(2) Preparation of Polypropylene/Heat-Resistant Resin Mixture Solution

Dry-blended were 100 parts by mass of a mixture comprising 90% by mass of polypropylene (PP) having Mw of $5.3 \times 10^5$ and 10% by mass of polyamide 6 (PA6) having Mw of $1.1 \times 10^4$, with 0.2 parts by mass of the above antioxidant. 30 parts by mass of the resultant mixture was charged into a double-screw extruder, and 70 parts by mass of liquid paraffin was supplied to the double-screw extruder via its side feeder. Melt blending was conducted at 230° C. and 250 rpm to prepare a polypropylene/heat-resistant resin mixture solution.

The Mws of UHMWPE, HDPE and PP were measured by gel permeation chromatography (GPC) under the following conditions.

Measurement apparatus: GPC-15° C. available from Waters Corporation,

Column: Shodex UT806M available from Showa Denko K.K.,

Column temperature: 135° C.,

Solvent (mobile phase): o-dichlorobenzene,

Solvent flow rate: 1.0 ml/minute,

Sample concentration: 0.1% by weight (dissolved at 135° C. for 1 hour),

Injected amount: 500 μl,

Detector: Differential Refractometer available from Waters Corp., and

Calibration curve: Produced from a calibration curve of a single-dispersion, standard polystyrene sample using a predetermined conversion constant.

(3) Formation of Membrane

The polyethylene solution A and the polypropylene/heat-resistant resin mixture solution B were supplied from separate double-screw extruders to a three-layer-forming T die, and extruded through the T-die such that the solution A, the solution B and the solution A were laminated in this order. The resultant extrudate was cooled by taking off by a cooling roll controlled at 18° C., thereby obtaining a three-layer, gel-like sheet. The three-layer, gel-like sheet was simultaneously and biaxially stretched to 5-fold by a tenter in both longitudinal direction (MD) and transverse direction (TD) at 115° C. Fixed to an aluminum frame plate of 20 cm×20 cm, the stretched three-layer, gel-like sheet was immersed in a washing bath of methylene chloride controlled at 25° C., and washed with the vibration of 100 rpm for 3 minutes to remove the liquid paraffin. The washed membrane was air-dried at room temperature, and fixed to the tenter to conduct a heat-setting treatment at 125° C. for 10 minutes, thereby producing a three-layer, microporous polyolefin membrane (thickness ratio of PE composition layer/PP/heat-resistant resin mixture layer/PE composition layer=20/60/20).

EXAMPLE 2

A three-layer, microporous polyolefin membrane was produced in the same manner as in Example 1 except for using polybutylene terephthalate (PBT) having Mw of $3.8\times10^4$ in place of polyamide 6.

EXAMPLE 3

A three-layer, microporous polyolefin membrane was produced in the same manner as in Example 1 except for using polyethylene terephthalate (PET) having Mw of $3.5\times10^4$ in place of polyamide 6.

EXAMPLE 4

(1) Preparation of Polyethylene Solution

A polyethylene solution was prepared in the same manner as in Example 1 except that the melt-blending temperature was 210° C.

(2) Preparation of Inorganic-Filler-Containing Polypropylene Solution

Dry-blended were a mixture of 90 parts by mass of polypropylene (PP) having Mw of $5.3\times10^5$ and 10 parts by mass of chopped glass fiber (GF) strand (fiber diameter: 5 μm, and fiber length: 1 mm) available from Asahi Fiber Glass Co., Ltd., with 0.2 parts by mass of the above antioxidant. 30 parts by mass of the resultant mixture was charged into a double-screw extruder, and 70 parts by mass of liquid paraffin was supplied to the double-screw extruder via its side feeder. Melt blending was conducted at 210° C. and 250 rpm to prepare an inorganic-filler-containing polypropylene solution.

(3) Formation of Membrane

The polyethylene solution A' and the inorganic-filler-containing polypropylene solution B' were supplied from separate double-screw extruders to a three-layer-forming T die, and extruded from the T die to form an extrudate having a laminate structure of solution A'/solution B'/solution A'. A three-layer, gel-like sheet obtained from the extrudate was simultaneously and biaxially stretched, washed, air-dried, and heat-set to produce a three-layer, microporous polyolefin membrane (thickness ratio of PE composition layer/inorganic-filler-containing PP layer/PE composition layer=25/50/25) in the same manner as in Example 1.

(4) Aspect Ratio of Inorganic Filler

A photomicrograph of glass fibers remaining after burning the three-layer, microporous polyolefin membrane was taken. Longer axes and shorter axes of 100 glass fiber particles were measured in the photomicrograph, and their ratios (longer axis/shorter axis) were averaged to determine the aspect ratio of glass fibers. As a result, it was 40.

EXAMPLE 5

A three-layer, microporous polyolefin membrane was produced in the same manner as in Example 4, except that mica (A-11, available from Yamaguchi Mica Co., Ltd.) was used in place of the chopped GF strand, and that the concentration of the mixture (PP+mica) in the inorganic-filler-containing polypropylene solution was 27% by mass. The aspect ratio of mica determined in the same manner as above was 30.

EXAMPLE 6

A three-layer, microporous polyolefin membrane was produced in the same manner as in Example 4, except that talc (High Micron HE5, available from Takehara Chemical Industrial Co., Ltd.) was used in place of the chopped GF strand, and that the concentration of the mixture (PP+talc) in the inorganic-filler-containing polypropylene solution was 27% by mass. The aspect ratio of talc determined in the same manner as above was 20.

COMPARATIVE EXAMPLE 1

A polyethylene solution was prepared in the same manner as in Example 1. A polypropylene solution containing no heat-resistant resin was prepared in the same manner as in Example 1 except for using only polypropylene. A three-layer, microporous polyolefin membrane was produced in the same manner as in Example 1 except for using the polyethylene solution and the polypropylene solution.

COMPARATIVE EXAMPLE 2

A microporous polyethylene membrane was produced in the same manner as in Example 1 except for using only the polyethylene solution.

COMPARATIVE EXAMPLE 3

A three-layer, microporous polyolefin membrane was produced in the same manner as in Example 4, except that calcium carbonate ($CaCO_3$) (SUNLIGHT, available from Takehara Chemical Industrial Co., Ltd.) was used in place of the chopped GF strand, and that the concentration of the mixture (PP+$CaCO_3$) in the inorganic-filler-containing polypropylene solution was 27% by mass. The aspect ratio of calcium carbonate determined in the same manner as above was 1.1.

The properties of the (three-layer) microporous polyolefin membranes obtained in Examples 1 to 6 and Comparative Examples 1 to 3 were measured by the following methods. The results are shown in Tables 1 to 3.

(1) Average Thickness (μm)

The thickness of the multi-layer, microporous membrane was measured at a 5-mm longitudinal interval over a width of 30 cm by a contact thickness meter, and the measured thickness was averaged.

(2) Air Permeability (Seconds/100 $cm^3$/20 μm)

The air permeability $P_1$ of the multi-layer, microporous membrane having a thickness $T_1$ was measured according to JIS P8117, and converted to air permeability $P_2$ at a thickness of 20 μm by the formula of $P_2=(P_1\times20)/T_1$.

(3) Porosity (%)

It was measured by a mass method.

(4) Pin Puncture Strength (mN/20 μm)

The maximum load was measured when a multi-layer, microporous membrane having a thickness $T_1$ was pricked with a needle of 1 mm in diameter with a spherical end surface (radius R of curvature: 0.5 mm) at a speed of 2 mm/second. The measured maximum load $L_1$ was converted to the maximum load $L_2$ at a thickness of 20 μm by the formula of $L_2=(L_1\times 20)/T_1$, which was regarded as pin puncture strength.

(5) Tensile Rupture Strength and Tensile Rupture Elongation

Measurement was conducted on a 10-mm-wide rectangular test piece according to ASTM D882.

(6) Heat Shrinkage Ratio (%)

The shrinkage ratio of a multi-layer, microporous membrane was measured three times in both longitudinal direction (MD) and transverse direction (TD) after exposed to 105° C. for 8 hours, and averaged.

(7) Shutdown Temperature

Using a thermomechanical analyzer (TMA/SS6000 available from Seiko Instruments, Inc.), a test piece of 10 mm (TD)×3 mm (MD) was heated from room temperature at a speed of 5° C./minute while being longitudinally drawn under a load of 2 g. A temperature at an inflection point observed near the melting point was regarded as a shutdown temperature.

(8) Meltdown Temperature (° C.)

Using the above thermomechanical analyzer, a test piece of 10 mm (TD)×3 mm (MD) was heated from room temperature at a speed of 5° C./minute while longitudinally drawing by a load of 2 g, to measure a temperature at which the membrane was broken by melting.

(9) Shutdown Speed

Each multi-layer, microporous membrane was heat-treated by contact with a plate controlled at 135° C. for various periods of time and then measured with respect to air permeability. A time period (second) until the air permeability reached 100,000 seconds/100 cm$^3$ (converted to the value of 20-μm thickness) was regarded as a shutdown speed.

(10) Ratio of Thickness Change by Heat Compression

A microporous membrane sample was sandwiched by a pair of press plates each having a highly smooth surface, and heat-compressed by a press machine at a pressure of 5 MPa (51 kgf/cm$^2$) and 90° C. for 5 minutes to measure the average thickness by the above method. A thickness change ratio was calculated, assuming that the pre-compression thickness was 100%.

(11) Post-Compression Air Permeability (Seconds/100 cm$^3$/20 μm)

The air permeability $P_1'$ of a microporous membrane sample (thickness: $T_1'$) heat-compressed under the above conditions was measured according to JIS P8117, and converted to the air permeability $P_2'$ at thickness of 20 μm as "post-compression air permeability" by the formula of $P_2'=(P_1'\times 20)/T_1'$.

TABLE 1

| | | | No. | | |
|---|---|---|---|---|---|
| | | | Example 1 | Example 2 | Example 3 |
| Resin Composition | | | | | |
| Polyethylene Composition A | | | | | |
| UHMWPE | Mw$^{(1)}$ | | $2.0 \times 10^6$ | $2.0 \times 10^6$ | $2.0 \times 10^6$ |
| | % by mass | | 25 | 25 | 25 |
| HDPE | Mw$^{(1)}$ | | $3.5 \times 10^5$ | $3.5 \times 10^5$ | $3.5 \times 10^5$ |
| | % by mass | | 75 | 75 | 75 |

TABLE 1-continued

| | | | No. | | |
|---|---|---|---|---|---|
| | | | Example 1 | Example 2 | Example 3 |
| PP/Heat-Resistant Resin Mixture B | | | | | |
| PP | Mw$^{(1)}$ | | $5.3 \times 10^5$ | $5.3 \times 10^5$ | $5.3 \times 10^5$ |
| | % by mass | | 90 | 90 | 90 |
| Heat-Resistant Resin | Type | | PA6$^{(4)}$ | PBT | PET |
| | Mw$^{(1)}$ | | $1.1 \times 10^4$ | $3.8 \times 10^4$ | $3.5 \times 10^4$ |
| | % by mass | | 10 | 10 | 10 |
| Production Conditions | | | | | |
| Concentration of PE Composition (% by mass) | | | 30 | 30 | 30 |
| Conc. of PP/Heat-Resistant Resin Mixture (% by mass) | | | 30 | 30 | 30 |
| Simultaneous Extrusion Layer Structure (S/I/S)$^{(2)}$ | | | A/B/A | A/B/A | A/B/A |
| Stretching | | | | | |
| Temperature (° C.) | | | 115 | 115 | 115 |
| Magnification (MD × TD)$^{(3)}$ | | | 5 × 5 | 5 × 5 | 5 × 5 |
| Heat-Setting | | | | | |
| Temperature (° C.) | | | 125 | 125 | 125 |
| Time (minute) | | | 10 | 10 | 10 |
| Properties | | | | | |
| Average Thickness (μm) | | | 24.8 | 24.9 | 24.8 |
| Layer Thickness Ratio (S/I/S) | | | 20/60/20 | 20/60/20 | 20/60/20 |
| Air Permeability (seconds/100 cm$^3$/20 μm) | | | 260 | 250 | 270 |
| Porosity (%) | | | 45 | 44 | 45 |
| Pin Puncture Strength | (g/20 μm) | | 420 | 400 | 410 |
| | (mN/20 μm) | | 4,116 | 3,920 | 4018 |
| Tensile Rupture Strength | (kg/cm$^2$) | MD | 1,320 | 1,290 | 1,300 |
| | (kPa) | MD | 129,360 | 126,420 | 127,400 |
| | (kg/cm$^2$) | TD | 1,120 | 1,090 | 1,100 |
| | (kPa) | TD | 109,760 | 106,820 | 107,800 |
| Tensile Rupture Elongation (%) | MD/TD | | 140/130 | 140/130 | 140/130 |
| Heat Shrinkage Ratio (%) | MD/TD | | 3/4 | 3/3 | 4/3 |
| Shutdown Temperature (° C.) | | | 135 | 135 | 135 |
| Meltdown Temperature (° C.) | | | 175 | 174 | 176 |
| Compression Resistance | | | | | |
| Thickness Change Ratio (%) | | | −30 | −32 | −35 |
| Post-Compression Air Permeability (seconds/100 cm$^3$/20 μm) | | | 320 | 310 | 330 |

Note:
$^{(1)}$Mw represents a mass-average molecular weight.
$^{(2)}$S represents a surface layer, I represents an inner layer, A represents a polyethylene composition solution, and B represents a PP/heat-resistant resin mixture solution.
$^{(3)}$MD represents a longitudinal direction, and TD represents a transverse direction.
$^{(4)}$PA6 represents polyamide 6.

TABLE 2

| | | | No. | | |
|---|---|---|---|---|---|
| | | | Example 4 | Example 5 | Example 6 |
| Resin Composition | | | | | |
| Polyethylene Composition A' | | | | | |
| UHMWPE | Mw$^{(1)}$ | | $2.0 \times 10^6$ | $2.0 \times 10^6$ | $2.0 \times 10^6$ |
| | % by mass | | 25 | 25 | 25 |
| HDPE | Mw$^{(1)}$ | | $3.5 \times 10^5$ | $3.5 \times 10^5$ | $3.5 \times 10^5$ |
| | % by mass | | 75 | 75 | 75 |
| PP/Heat-Resistant Resin Mixture B' | | | | | |
| PP | Mw$^{(1)}$ | | $5.3 \times 10^5$ | $5.3 \times 10^5$ | $5.3 \times 10^5$ |
| | % by mass | | 90 | 90 | 90 |
| Inorganic Filler | Type | | GF$^{(5)}$ | Mica$^{(6)}$ | Talc$^{(7)}$ |
| | Aspect Ratio$^{(2)}$ | | 40 | 30 | 20 |
| | % by mass | | 10 | 10 | 10 |

TABLE 2-continued

|  | Example 4 | Example 5 | Example 6 |
|---|---|---|---|
| Production Conditions | | | |
| Concentration of PE Composition (% by mass) | 30 | 30 | 30 |
| Conc. of PP/Inorganic Filler Mixture (% by mass) | 30 | 27 | 27 |
| Simultaneous Extrusion Layer Structure (S/I/S)[3] | A'/B'/A' | A'/B'/A' | A'/B'/A' |
| Stretching | | | |
| Temperature (° C.) | 115 | 115 | 115 |
| Magnification (MD × TD)[4] | 5 × 5 | 5 × 5 | 5 × 5 |
| Heat-Setting | | | |
| Temperature (° C.) | 125 | 125 | 125 |
| Time (minute) | 10 | 10 | 10 |
| Properties | | | |
| Average Thickness (μm) | 24.8 | 24.7 | 24.9 |
| Layer Thickness Ratio (S/I/S) | 25/50/25 | 25/50/25 | 25/50/25 |
| Air Permeability (seconds/100 cm³/20 μm) | 270 | 280 | 290 |
| Porosity (%) | 45 | 44 | 43 |
| Pin Puncture Strength (g/20 μm) | 430 | 420 | 415 |
| (mN/20 μm) | 4,214 | 4,116 | 4,067 |
| Tensile Rupture Strength (kg/cm²) MD | 1,350 | 1,340 | 1,330 |
| (kPa) MD | 132,300 | 131,320 | 130,340 |
| (kg/cm²) TD | 1,150 | 1,140 | 1,130 |
| (kPa) TD | 112,700 | 111,720 | 110,740 |
| Tensile Rupture Elongation MD/TD (%) | 120/110 | 120/110 | 120/110 |
| Heat Shrinkage Ratio (%) MD/TD | 3/4 | 3/4 | 3/4 |
| Shutdown Temperature (° C.) | 135 | 135 | 135 |
| Meltdown Temperature (° C.) | 180 | 178 | 177 |

Note:
[1] Mw represents a mass-average molecular weight.
[2] A photomicrograph of inorganic filler remaining after burning the three-layer, microporous polyolefin membrane was taken. Longer axes and shorter axes of 100 inorganic filler particles were measured in the photomicrograph, and their ratios (longer axis/shorter axis) were averaged to determine the aspect ratio.
[3] S represents a surface layer, I represents an inner layer, A' represents a polyethylene composition solution, and B' represents an inorganic-filler-containing PP solution.
[4] MD represents a longitudinal direction, and TD represents a transverse direction.
[5] Chopped glass fiber (GF) strand (fiber diameter: 5 μm, and fiber length: 1 mm) available from Asahi Fiber Glass Co., Ltd.
[6] "A-11" available from Yamaguchi Mica Co., Ltd.
[7] "High Micron HE5" available from Takehara Chemical Industrial Co., Ltd.

TABLE 3

|  | Comp. Ex. 1 | Comp. Ex. 2 | Comp. Ex. 3 |
|---|---|---|---|
| Resin Composition | | | |
| Polyethylene Composition A" | | | |
| UHMWPE Mw[1] | 2.0 × 10⁶ | 2.0 × 10⁶ | 2.0 × 10⁶ |
| % by mass | 25 | 25 | 25 |
| HDPE Mw[1] | 3.5 × 10⁵ | 3.5 × 10⁵ | 3.5 × 10⁵ |
| % by mass | 75 | 75 | 75 |
| PP-Containing Layer B" | | | |
| PP Mw[1] | 5.3 × 10⁵ | — | 5.3 × 10⁵ |
| % by mass | 100 | — | 90 |
| Heat-Resistant Resin Type | — | — | — |
| Mw[1] | — | — | — |
| % by mass | — | — | — |
| Inorganic Filler | — | — | CaCO₃[5] |
| Aspect Ratio[2] | — | — | 1.1 |
| % by mass | — | — | 10 |

TABLE 3-continued

|  | Comp. Ex. 1 | Comp. Ex. 2 | Comp. Ex. 3 |
|---|---|---|---|
| Production Conditions | | | |
| Concentration of PE composition (% by mass) | 30 | 30 | 30 |
| Concentration of PP/Inorganic Filler Mixture (% by mass) | 30 | — | 27 |
| Simultaneous Extrusion Layer Structure (S/I/S)[3] | A"/B"/A" | — | A"/B"/A" |
| Stretching | | | |
| Temperature (° C.) | 115 | 115 | 115 |
| Magnification (MD × TD)[4] | 5 × 5 | 5 × 5 | 5 × 5 |
| Heat-Setting | | | |
| Temperature (° C.) | 125 | 125 | 125 |
| Time (minute) | 10 | 10 | 10 |
| Properties | | | |
| Average Thickness (μm) | 24.8 | 24.9 | 24.9 |
| Layer Thickness Ratio (S/I/S) | 20/60/20 | — | 25/50/25 |
| Air Permeability (seconds/100 cm³/20 μm) | 650 | 440 | 330 |
| Porosity (%) | 38 | 41 | 41 |
| Pin Puncture Strength (g/20 μm) | 350 | 370 | 360 |
| (mN/20 μm) | 3,430 | 3,626 | 3,528 |
| Tensile Rupture Strength (kg/cm²) MD | 1,230 | 1,280 | 1,250 |
| (kPa) MD | 120,540 | 125,440 | 122,500 |
| (kg/cm²) TD | 950 | 1,010 | 1,010 |
| (kPa) TD | 93,100 | 98,980 | 98,980 |
| Tensile Rupture Elongation MD/TD (%) | 145/150 | 130/195 | 130/195 |
| Heat Shrinkage Ratio (%) MD/TD | 6/4 | 6/4 | 6/4 |
| Shutdown Temperature (° C.) | 135 | 135 | 135 |
| Meltdown Temperature (° C.) | 170 | 165 | 168 |
| Compression Resistance | | | |
| Thickness Change Ratio (%) | −10 | −15 | — |
| Post-Compression Air Permeability (seconds/100 cm³/20 μm) | 700 | 1,500 | — |

Note:
[1] Mw represents a mass-average molecular weight.
[2] A photomicrograph of inorganic filler remaining after burning the three-layer, microporous polyolefin membrane was taken. Longer axes and shorter axes of 100 inorganic filler particles were measured in the photomicrograph, and their ratios (longer axis/shorter axis) were averaged to determine the aspect ratio.
[3] S represents a surface layer, I represents an inner layer, A" represents a polyethylene composition solution, and B" represents a PP-containing solution.
[4] MD represents a longitudinal direction, and TD represents a transverse direction.
[5] "SUNLIGHT" available from Takehara Chemical Industrial Co., Ltd.

As is clear from Tables 1 and 2, the three-layer, microporous polyolefin membranes of Examples 1 to 6 had well-balanced permeability, mechanical strength, heat shrinkage resistance, shutdown properties and meltdown properties. Particularly, the three-layer, microporous polyolefin membranes of Examples 1 to 3 had excellent compression resistance (compression deformability and permeability after compression).

On the other hand, the three-layer, microporous polyolefin membrane of Comparative Example 1, which did not contain a heat-resistant resin or inorganic filler having an aspect ratio of 2 or more in the polypropylene-containing layer, had poorer permeability, pin puncture strength and meltdown properties than those of Examples 1 to 6. The three-layer, microporous membrane of Comparative Example 1 was poorer than those of Examples 1 to 3 in heat-compression deformability and air permeability after compression. The microporous membrane of Comparative Example 2 made only of a polyethylene composition was poorer than those of Examples 1 to 6 in pin puncture strength and meltdown properties. The three-layer, microporous membrane of Comparative Example 2 was poorer than those of Examples 1 to 3 in heat-compression deformability and air permeability after compression. The three-layer, microporous polyolefin membrane of Comparative Example 3, which contained inorganic filler having an aspect ratio of less than 2 in the polypropylene-containing layer, was poorer than those of Examples 4 to 6 in mechanical strength and meltdown properties.

Effect Of The Invention

This invention provides a multi-layer, microporous polyolefin membrane comprising a polyethylene resin layer and a polypropylene-containing layer, thereby having well-balanced permeability, mechanical strength, heat shrinkage resistance, shutdown properties and meltdown properties. Such multi-layer, microporous membrane has sufficiently large pore diameters particularly in a polypropylene-containing microporous layer, thereby having excellent electrolytic-solution permeability. The use of the multi-layer, microporous polyolefin membrane of this invention as a separator provides batteries with excellent capacity, cycle characteristics, discharge properties, heat resistance, storability and productivity.

What is claimed is:

1. A three-layer, microporous polyolefin membrane comprising two outer microporous layers made of a polyethylene resin, and one inner microporous layer made of polypropylene and a heat-resistant resin having a melting point or a glass transition temperature of 180° to 260° C., wherein said polyethylene resin is a mixture of ultra-high-molecular-weight polyethylene having a mass-average molecular weight of $1 \times 10^6$ to $15 \times 10^6$ and high-density polyethylene, and wherein the total content of said heat-resistant resin is 3 to 30% by mass based on the total of said polypropylene and said heat-resistant resin.

2. A three-layer, microporous polyolefin membrane comprising two outer microporous layers made of a polyethylene resin, and one inner microporous layer made of polypropylene and inorganic filler having an aspect ratio of 2 or more, wherein said polyethylene resin is a mixture of ultra-high-molecular-weight polyethylene having a mass-average molecular weight of $1 \times 10^6$ to $15 \times 10^6$ and high-density polyethylene, and wherein the content of the inorganic filler is 0.1 to 15% by mass based on 100% by mass of said polypropylene.

* * * * *